United States Patent [19]

Fouss et al.

[11] Patent Number: 4,523,613
[45] Date of Patent: Jun. 18, 1985

[54] MULTI-LAYERED CORRUGATED CONDUIT WITH "BLACK-EYE" LIKE APERTURES

[75] Inventors: James L. Fouss; John J. Parker; James L. Child, Jr., all of Findlay, Ohio; Donald W. Sting, New Canaan, Conn.

[73] Assignee: Hancor, Inc., Findlay, Ohio

[21] Appl. No.: 318,740

[22] Filed: Nov. 6, 1981

Related U.S. Application Data

[63] Continuation-in-part of Ser. No. 164,969, Jul. 1, 1980, Pat. No. 4,360,042, which is a continuation-in-part of Ser. No. 967,514, Dec. 7, 1978, Pat. No. 4,245,924.

[51] Int. Cl.³ .............................. F16L 11/11; E02B 11/00
[52] U.S. Cl. .................................... 138/121; 405/43; 405/49; 405/45
[58] Field of Search .............. 138/119, 105, 121, 128, 138/170, 173; 405/43, 45, 48, 49, 124

[56] References Cited

U.S. PATENT DOCUMENTS

| | | | |
|---|---|---|---|
| 770,236 | 9/1904 | Lauridtzen | 138/159 |
| 980,442 | 1/1911 | Schlafly | 405/48 |
| 1,040,442 | 10/1912 | Shannon | 138/173 |
| 2,153,789 | 4/1939 | Carswell et al. | 405/49 X |
| 2,259,335 | 10/1941 | Carswell et al. | 405/49 |
| 2,286,197 | 6/1942 | Claybaugh | 138/145 |
| 2,433,300 | 12/1947 | Shafer | 405/47 |
| 2,645,249 | 7/1953 | Davis et al. | 138/137 |
| 2,663,997 | 12/1953 | Schmidt et al. | 405/49 |
| 2,782,805 | 2/1957 | Leadbetter | 138/168 |
| 2,876,801 | 3/1959 | November | 138/50 |
| 3,103,789 | 9/1963 | McDuff et al. | 405/45 |
| 3,333,422 | 8/1967 | Neyland | 405/48 |
| 3,336,950 | 8/1967 | Fochler | 138/121 |
| 3,343,567 | 9/1967 | Mulligan et al. | 138/119 |
| 3,369,367 | 2/1968 | Saad et al. | 405/46 |
| 3,440,822 | 4/1969 | Hegler | 405/45 |
| 3,440,823 | 4/1969 | Olsen | 405/43 |
| 3,461,531 | 8/1969 | Gain | 138/173 X |
| 3,487,574 | 1/1970 | Loof | 40/316 |
| 3,495,410 | 2/1970 | Bailey et al. | 405/46 |
| 3,508,587 | 4/1970 | Mauch | 138/119 |
| 3,528,251 | 9/1970 | Falk | 405/403 |
| 3,570,251 | 3/1971 | Roberts | 405/46 |
| 3,583,424 | 6/1971 | Bryant | 138/156 |
| 3,653,216 | 4/1972 | Stickler | 405/33 |
| 3,679,242 | 7/1972 | Hess | 405/49 |
| 3,681,925 | 8/1972 | Schmunk et al. | 405/49 |
| 3,682,502 | 8/1972 | Corriston et al. | 138/119 X |
| 3,693,664 | 9/1972 | Schmunk | 138/121 |
| 3,721,269 | 3/1973 | Choate et al. | 138/119 |
| 3,818,948 | 6/1974 | Hedges | 138/119 |
| 3,824,886 | 7/1974 | Hegler | 83/54 |
| 3,830,067 | 8/1974 | Osborn et al. | 405/45 |
| 3,832,855 | 9/1974 | Maroschak | 138/173 X |
| 3,834,275 | 9/1974 | Newland | 409/293 |
| 3,908,704 | 9/1975 | Clement et al. | 138/121 |
| 3,939,875 | 2/1976 | Osborn et al. | 138/119 |
| 4,079,757 | 3/1978 | Fischer et al. | 138/121 |
| 4,140,422 | 2/1979 | Crumpler et al. | 405/49 |
| 4,245,924 | 1/1981 | Fouss et al. | 405/45 |
| 4,303,104 | 12/1981 | Hegler et al. | 138/173 |

FOREIGN PATENT DOCUMENTS

| | | |
|---|---|---|
| 1459414 | 10/1970 | Fed. Rep. of Germany . |
| 2262994 | 7/1974 | Fed. Rep. of Germany ........ 405/43 |
| 69088 | 11/1969 | German Democratic Rep. . |
| 6401043 | 8/1964 | Netherlands . |

*Primary Examiner*—John W. Shepperd
*Attorney, Agent, or Firm*—Fay, Sharpe, Fagan Minnich & McKee

[57] ABSTRACT

The conduit includes a top wall (A) and a base (B). The top wall A has an apex area (10) which is connected with a first corrugated side wall (12) and a second corrugated side wall (32). The side walls having alternating peaks (22, 42) and valleys (24, 44). The peaks have apex ends (26, 46) which are disposed closely adjacent each other at the apex area to define a hinge region therebetween. Disposed along the apex area and on the side wall peaks are a plurality of outward projecting dimples (70, 72, 74) which are severable by a tangentially disposed knife blade to form a plurality of apertures (50, 52, 54). The base B is a flexible sheet of plastic mesh material.

7 Claims, 6 Drawing Figures

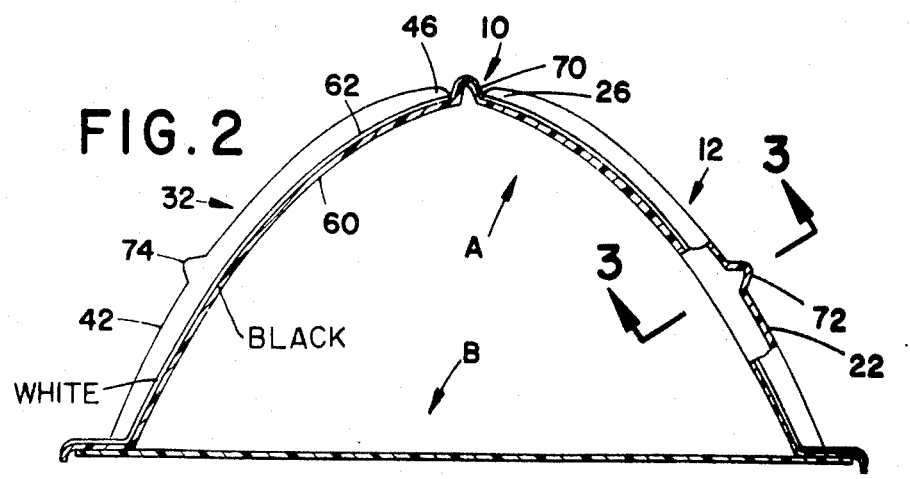
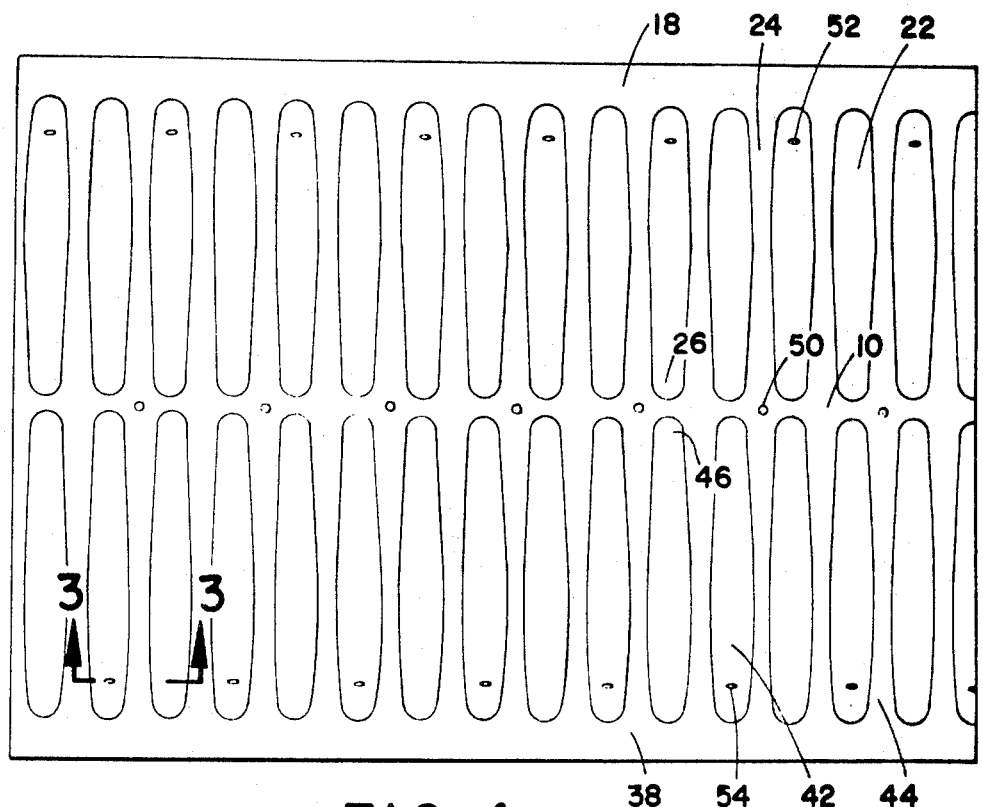

MULTI-LAYERED CORRUGATED CONDUIT WITH "BLACK-EYE" LIKE APERTURES

BACKGROUND OF THE INVENTION

This application is a continuation-in-part of patent application Ser. No. 164,969, filed July 1, 1980, now U.S. Pat. No. 4,360,042, which in turn is a continuation-in-part of application Ser. No. 967,514 filed Dec. 7, 1978, now U.S. Pat. No. 4,245,924.

This invention relates to the art of pipes, tubing, and conduits. The invention finds particular application in drainage tubing used to remove excess water from agricultural fields and will be described with particular reference thereto. It is to be appreciated, however, that the invention has other applications such as septic or leach bed tubing, culverts, tunnels, subterranean conduits, other types of drainage conduits, and the like.

Conventionally, drainage tubing is used to remove excess surface and subsurface water from agricultural fields as well as from commercial and residential properties. Generally, a trench is dug in the soil by a trenching machine, the drainage tubing positioned on the floor of the trench, and the trench refilled. Water which enters the tubing at one end or at openings along its length are carried through the tubing for disposal.

Most commonly, drainage tubing is corrugated plastic tubing which is circular in cross section. The tubing constructions consist of alternating outward projecting peaks and inward projecting valleys which increase the strength and rigidity of the tubing. The interior of the peaks are hollow and form troughs which collect sediment and cause turbulence in the flow of fluids. The tubing is normally constructed of a single layer of high density, thermoplastic material. For enhanced properties a filler is sometimes added to polyvinylchloride and polypropoglene. To prevent polyethylene from being weakened by ultraviolet light, carbon black is commonly added. To allow water or other fluids to enter or exit the tubing, the tubing is usually perforated in the valley areas at spaced intervals.

An arched conduit construction is described and claimed in the present assignee's U.S. Pat. No. 4,245,924, issued January 20, 1981. In this patent, it is shown that perforating only a flat base portion of the arched conduit is at least as effective as perforating a circular conduit intermittently around its circumference.

One of the problems with the prior art tubing has been the propensity of the carbon black filler to absorb energy. When exposed to sunlight during storage, handling, and installation, the carbon black readily absorbs solar radiation. This raises the temperature of the plastic which in turn lowers its elastic modulus i.e. softens it. The softened plastic tubing is easily deformed by the weight of other tubing in storage, by mechanical installation equipment, by rough handling, by the weight of backfill, and the like.

Another problem with the prior art tubing is that perforating the corrugated top wall sometimes required interrupting the manufacturing process during the perforating. That is, the continuously moving tubing in the manufacturing line was intermittently stopped to allow the perforating process to take place. Other perforating apparatus included complex interrelated moving machinery parts, note for example U.S. Pat. No. 4,180,357 issued Dec. 25, 1979. The above-referenced arched tubing patent of the present assignee overcame this problem by perforating only the flexible base. However, it has been found desirable for some applications to have the top wall perforated as well.

Yet another problem with the prior art tubing occurs in shipping. Rigid non-foldable arched and circular tubing have a large volume due to the interior bore but relatively little weight due to the thin-walled construction. This tends to fill the volume capacity of transporting vehicles without meeting their weight capacity. To improve shipping efficiency, the arched conduit of the present assignee'above-referenced patent has a hinge at its apex area to enable the tubing to be flattened. When the hinge is defined by a sharp groove, there is a tendency for the plastic to fatigue or crack along the hinge. When the hinge is broadened, the actual fold line may vary altering the apex of the arch, hence changing the cross section of the arch and weakening it.

The present invention contemplates a new and improved conduit product which overcomes the above problems and others. It provides a new and improved arched conduit construction which is economical to manufacture, high in both impact and structural strength, easy to ship and handle, and readily adaptable to use in a broad range of practical applications.

SUMMARY OF THE INVENTION

In accordance with the present invention, there is provided a conduit product comprising a top wall and a generally flat base. The top wall includes a longitudinally elongated apex area having a plurality of apertures and first and second longitudinally elongated side walls having a longitudinally elongated apex edge area which is connected with the apex area. The generally flat base is operatively connectable with the first and second side walls adjacent base edge areas which are opposite from their apex edge areas.

In accordance with another aspect of the present invention, there is provided a conduit product comprising a top wall and a generally flat base. The top wall includes a longitudinally elongated apex area and first and second longitudinally elongated side walls which are operatively connected with the apex area. At least one of the apex area and the first and second side walls has a plurality of dimples thereon such that the top wall is conveyable past a sharp blade in such a manner that the blade severs the dimples creating apertures through the top wall. The generally flat base is operatively connectable with the first and second side wall base edge areas.

One advantage of the present invention is that it provides a conduit construction which is easier to manufacture and perforate.

Another advantage of the present invention is that it yet is stronger, it requires less plastic material to manufacture.

Yet other advantages of the present invention include that it inhibits heat build up, it is foldable to reduce its bulk, it protects filter materials from damage during storage and shipping, it has improved fluid flow characteristics, and it reduces the amount of collected sediment.

Still other advantages and benefits of the present invention will become apparent to those skilled in the art upon reading and understanding the following detailed description of the preferred embodiments and the accompanying drawings.

BRIEF DESCRIPTION OF THE DRAWINGS

The invention may take physical form in certain parts and arrangements of parts. The drawings are only for the purpose of illustrating a preferred embodiment of the invention and are not to be construed as limiting the invention.

FIG. 2 is a sectional view of a conduit construction in accordance with the present invention before being perforated;

FIG. 4 is a top plan view of the conduit construction of FIG. 2;

DETAILED DESCRIPTION OF THE PREFERRED EMBODIMENTS

Figure 1:
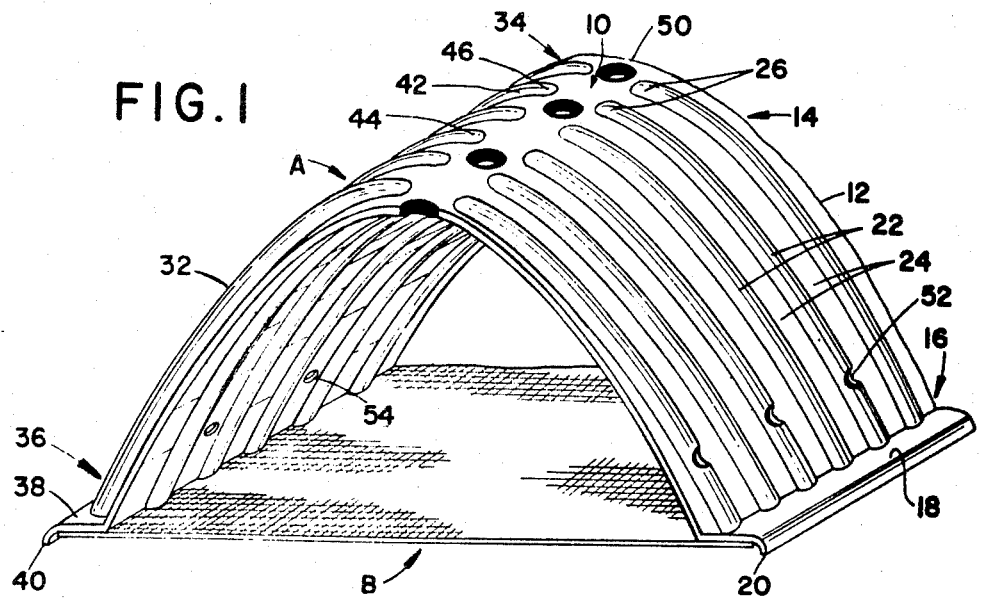
FIG. 1 is a perspective view of a conduit construction in accordance with the present invention.

With primary reference to FIG. 1, the conduit construction includes a top wall A which is strong relative to top compressive loading forces and a base B which is relatively strong in tension. The top wall A includes a longitudinally elongated apex or hinge area 10 which extends along the length of the conduit construction. A first longitudinally elongated side wall 12 has a longitudinally elongated apex edge area 14 and a longitudinally elongated base edge area 16. The first side wall apex edge area is connected longitudinally with the apex area 10. Adjacent the first side wall base edge area 16, the first side wall has an outward extending foot or flange portion 18 and a downward extending claw portion 20. When installed, the claw portion 20 digs into the soil to anchor the base edge areas against moving toward each other folding or collapsing the conduit. Extending generally between the first side wall apex and base edge areas are a plurality of alternating peaks 22 and valleys 24. The first side wall peaks have apex ends 26 which taper from a corrugation height of about 0.190-0.250 inches to the valley level along a generally semiround interface area. The alternating first side wall peaks and valleys provide a transverse corrugation along the first side wall such that the first side wall is corrugated. p A second longitudinally elongated side wall 32 has a longitudinally elongated apex edge area 34 and a longitudinally elongated base edge area 36. The second side wall apex edge area 34 is connected with the apex area 10. Adjacent the second side wall base edge area 36, is an outward extending second side wall foot or flange portion 38 and a downward extending claw portion 40. Disposed transversely generally between the second side wall apex and base edge areas are a plurality of alternating second side wall peak portions 42 and valley portions 44. The second side wall peaks have apex ends 46 which taper from a corrugation height of about 0.190-0.250 inches down to the valley level along a generally semiround interface area.

The apex area 10 and the first and second side wall valleys 24 and 44 define a continuous arch cross section. The apex area is sufficiently flexible that it functions as a hinge about which the first and second side walls are foldable. The first and second side wall peak apex ends 26 and 46 which are disposed closely adjacent each other to define a longitudinal fold line or hinge region along the apex ends, are displaced by about twice the thickness of the apex area, i.e. about 0.125 to 0.160 inches. Optionally, the apex area 10 and the first and second side wall peaks may define a continuous arch with the valleys recessed therebelow. As yet another option, the peaks may extend across the apex area removing the ready apex folding property of the conduit. To facilitate the ingress or egress of fluids into the conduit product, a plurality of apex apertures 50 are disposed in the apex area 10. The apex apertures are centered along the apex hinge region at its intersection with corrugation valleys. The apex apertures define weakened spots along the hinge region to assist in centering the fold. Preferably, the apex apertures are about 0.1-0.250 inches in diameter. A plurality of first side wall apertures 52 are disposed in the peak portions 22 of the first side wall and second side wall aperture portions 54 are diposed in second peak portions 42 of the second side wall.

In the preferred embodiment, the base portion B is a flexible sheet which is connectable adjacent the first and second side wall base end edges 16 and 36. More specifically, the base B is attached to the flange portions 18 and 38. Further to the preferred embodiment, the base B is a sheet of extruded porous hydrophilic plastic material. The porous material, such as netting or mesh, is sufficiently fine that it blocks soil and sand particles from entering the conduit while allowing fluids to enter and leave. A mesh having apertures with a nominal size on the order of 100 to 300 microns is preferred. Optionally, other apertured sheets may be utilized, such as spun bonded materials, slit or slotted fluid impermeable sheets, and the like. Preferred porous plastic materials include DELNET plastic netting from the Hercules Corporation or CONWED plastic netting from the Conwed Company.

Figure 3:
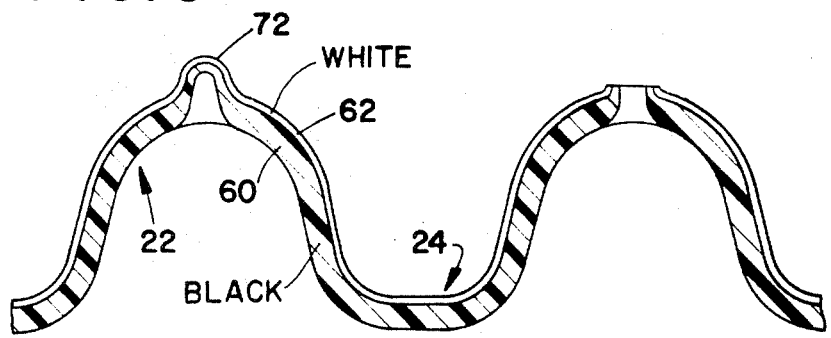
FIG. 3 is an enlarged sectional view through section 3—3 of FIG. 2 with an aperture or severed dimple illustrated on the right hand corrugation for clearer illustration of the present invention.

With particular reference to FIGS. 2 and 3, the top wall A is a layered plastic construction. The top wall has an inner layer 60 of a first plastic material and an outer layer 62 of a second plastic material. In the preferred embodiment, the inner plastic material is polyethylene with carbon black filler and the outer layer 62 is polyethylene with a titanium dioxide filler. This provides the exterior of the top wall with a white, light reflective surface which inhibits the conduit from becoming warm when stored in sunlight. This retards the top wall from becoming softer or decreasing its elastic modulus from an increase in heat and from becoming deformed or damaged. Optionally, other combinations of layers of material may be used, such as expanded polymeric material which is expanded with a CELLOGEN additive in amounts to cause a 20 to 40% reduction in the specific gravity. Other top wall materials include virgin and reprocessed polymers, polyethylene, polyurethane, nylon, polyvinyle chloride, styrene polymers, and the like.

With reference to FIGS. 2, 3, and 4, the top wall A of the conduit product is initially formed with a dimple where each of the apertures is to be located. Specifically, the apex area 10 is molded with a plurality of dimples 70 projecting outward therefrom. The first side wall peak portions 22 have dimples 72 projecting outward therefrom and the second side wall peak portions 42 have dimples 74 projecting outwardly therefrom. In the preferred embodiment, dimples are disposed on alternate peaks of the side walls. Optionally, on conduit in which the top wall is open along one edge rather than closed as in circular conduit, the dimple may project inward from the apex area and the valleys.

Figure 5:
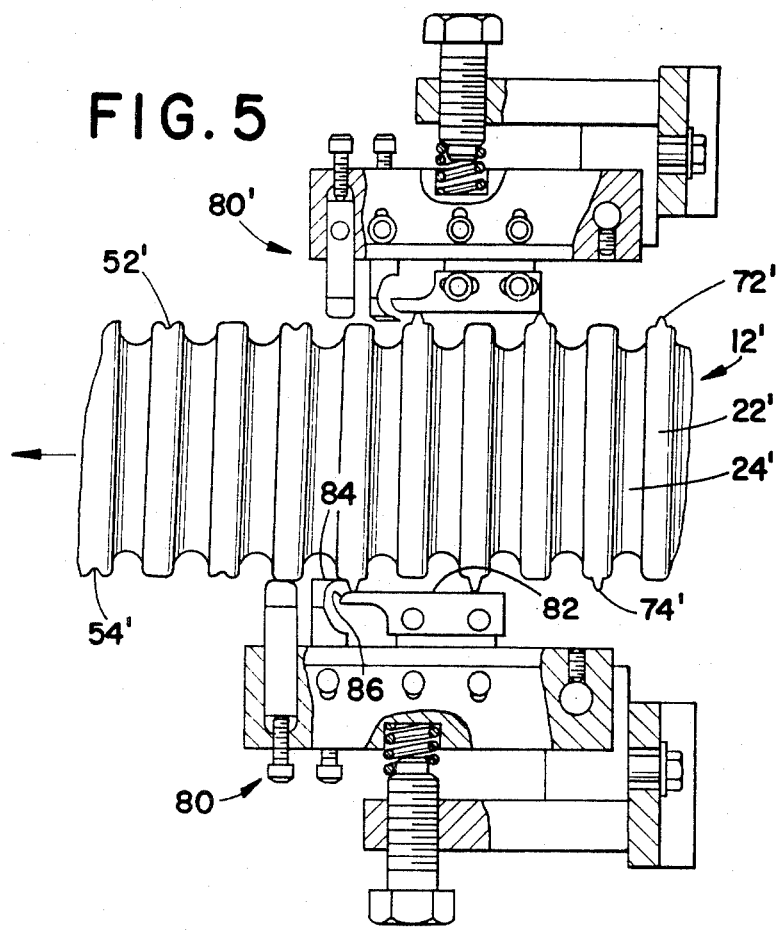
FIG. 5 illustrates a preferred perforating process in conjunction with a corrugated tubing product; and, FIG. 6 is a sectional view of an alternate embodiment if a conduit construction in accordance with the present invention.

With reference to FIG. 5, the apex and side wall apertures are formed by passing the conduit along knife blades such that the dimples are severed. To emphasize that the formation of apertures from dimples is also applicable to circular and other shaped conduit, circular conduit is illustrated in FIG. 5. The circular conduit has a circular corrugated side wall 12' having alternating peak portions 22' and valley portions 24'. Projecting outward from the peak portions are a plurality of dimples 72' and 74' which are severed to form apertures 52' and 54'. A dimple severing means 80' includes a horizontally disposed guide surface 82 along which the dimples slide. A knife blade 84 is disposed adjacent a downstream end of the horizontal surface 82. The guide surface has a guide portion 86 which extends below the knife blade 84 to inhibit the dimples from flipping out of contact with the blade and being only partially severed. A like severing means 80' severs the other longitudinally disposed row of dimples 72'. If the top wall is open on one side or able to be opened outward, the dimples may project inward and the severing means may be disposed along the interior of the top wall.

Figure 6:
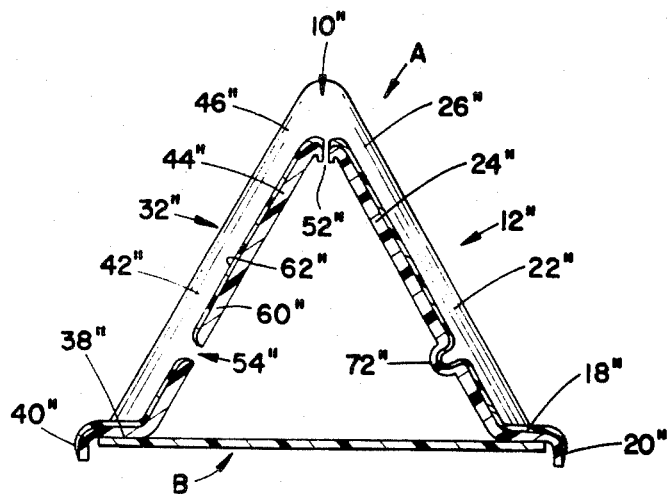

The present invention is applicable to corrugated and non-corrugated conduits of various stages in addition to the parabolicly arched conduit of FIGS. 1-4 and the circular conduit of FIG. 5. For example, as illustrated in FIG. 6, the conduit may have a generally triangularly arched cross section. In the embodiment of FIG. 6, like elements with the embodiment of FIGS. 1-4 are denoted with the same reference numeral followed by a double prime ("). The top wall A includes an apex area 10", a first side wall 12", and a second side wall 32". The first side wall has alternate peaks 22" and valleys 24" and projecting dimples 72" which are severable to form side wall apertures. The second side wall 32" has alternating peaks 42" and valleys 44". Side wall apertures 54" are formed in the valleys or peaks by severing projecting dimples.

The invention has been described with reference to the preferred embodiment. Obviously, modifications and alterations will occur to others upon reading and understanding the preceeding detailed description. It is our intention that the invention be construed as including all such modifications and alterations insofar as they come within the scope of the appended claims or the equivalents thereof.

Having thus described a preferred embodiment of our invention, we now claim our invention to be:

1. A multi-layered corrugated plastic conduit comprising:
    at least a first longitudinally extending side wall, the side wall comprising an inner layer of a first plastic material and an outer layer of a second material, the side wall having a plurality of transversely extending alternating peaks and valleys;
    the side wall defining a plurality of apertures therein, each aperture being defined by an opening in the outer layer which has a peripheral ring of the first material extending therethrough, the aperture being defined in and surrounded completely by the first material.

2. The conduit as set forth in claim 1 wherein the apertures are defined in the outermost portions of the peaks.

3. The conduit as set forth in claim 1 wherein the first plastic material is carbon black filled, whereby the first plastic material tends to absorb heat from sunlight and become softer and less rigid, and wherein the second material is sunlight reflective, whereby the outer layer reflects sunlight and reduces softening of the inner layer.

4. The conduit as set forth in claim 3 wherein the first material is black and the second material is white such that the conduit is white with a black ring surrounding each aperture.

5. The conduit as set forth in claim 1 wherein the side wall has a circular cross section.

6. A multi-layered corrugated plastic conduit comprising:
    a longitudinally extending multi-layered, corrugated side wall, the side wall comprising at least a conduit inner layer of a first plastic material and a conduit outer layer of a second material, the corrugated side wall including a plurality of transversely extending alternating peaks and valleys, each peak having a peak outermost wall portion extending around the conduit and having a width extending generally longitudinally;
    at least a first longitudinally extending row of apertures defined in the peak outermost wall portions, each aperture being defined by an opening in the outer layer which has a peripheral ring of the first material extending therethrough, the aperture being defined in and surrounded completely by the first material.

7. A continuously blow-molded, circular corrugated plastic conduit comprising:
    a longitudinally extending corrugated conduit side wall with a generally circular transverse cross section and alternating peaks and valleys extending generally peripherally therearound, each peak having an outermost wall portion extending around the conduit and having a width extending generally longitudinally;
    the conduit side wall including an inner layer of carbon black filled plastic and an outer surface layer of white plastic;
    at least a first longitudinally extending row of apertures defined in the side wall, each aperture being defined by an opening in the outer white plastic layer which has a peripheral ring of the carbon black filled plastic extending therethrough, the aperture being defined in and surrounded completely by the carbon black filled plastic, whereby each aperture defined in the white layer is surrounded by a black ring to provide a black eye like appearance.

* * * * *